(12) United States Patent
Liu et al.

(10) Patent No.: US 8,083,833 B2
(45) Date of Patent: Dec. 27, 2011

(54) FLEXIBLE TEMPLATE-DIRECTED MICROPOROUS PARTIALLY PYROLYZED POLYMERIC MEMBRANES

(75) Inventors: Chunqing Liu, Schaumburg, IL (US); David A. Lesch, Hoffman Estates, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 688 days.

(21) Appl. No.: 11/679,160

(22) Filed: Feb. 26, 2007

(65) Prior Publication Data

US 2007/0209506 A1    Sep. 13, 2007

Related U.S. Application Data

(60) Provisional application No. 60/781,289, filed on Mar. 10, 2006.

(51) Int. Cl.
*B01D 53/22* (2006.01)

(52) U.S. Cl. ........... 95/45; 95/43; 96/4; 96/11; 427/244; 427/256

(58) Field of Classification Search ............... 95/45, 43; 96/4, 11; 427/244, 256
See application file for complete search history.

(56) References Cited

U.S. PATENT DOCUMENTS

| | | | |
|---|---|---|---|
| 3,567,632 A | 3/1971 | Richter et al. | 210/23 |
| 4,230,463 A | 10/1980 | Henis et al. | 55/16 |
| 4,705,540 A | 11/1987 | Hayes et al. | 55/16 |
| 4,728,345 A | 3/1988 | Murphy | 55/158 |
| 4,740,219 A | 4/1988 | Kulprathipanja et al. | 155/16 |
| 4,880,442 A | 11/1989 | Hayes et al. | 55/16 |
| 4,925,459 A | 5/1990 | Rojey et al. | 155/16 |
| 4,968,430 A | 11/1990 | Hildebrand et al. | 210/640 |
| 5,085,676 A | 2/1992 | Ekiner et al. | 55/158 |
| 5,104,532 A | 4/1992 | Thompson et al. | 210/224 |
| 5,127,925 A | 7/1992 | Kulprathipanja et al. | 55/16 |
| 5,288,304 A | 2/1994 | Koros et al. | 95/45 |
| 5,431,864 A | 7/1995 | Rao et al. | 264/29.5 |

(Continued)

FOREIGN PATENT DOCUMENTS

EP    1 1188 477 A1    3/2002

(Continued)

OTHER PUBLICATIONS

Van Der Vis et al. (The thermodynamic properties of tetraethoxysilane (TEOS) and an infrared study of its thermal decomposition), Journal de Physique IV, 1993.*

(Continued)

*Primary Examiner* — Jason M Greene
*Assistant Examiner* — Anthony Shumate
(74) *Attorney, Agent, or Firm* — Mark Goldberg

(57) ABSTRACT

This invention describes a new concept of flexible template-directed microporous partially pyrolyzed polymeric membranes which have greatly improved performance in separation of gas pairs compared to their precursor polymeric membranes. Organic hosts, such as crown ethers, cyclodextrins (CDs), calixarenes (CXs), and spherands, or polymeric additives, such as poly(ethylene glycol) (PEG) and polyvinylpyrrolidone (PVP) were used as the micropore-forming templates. Micropore-forming template/polymer blend membranes comprising organic micropore-forming templates embedded in a polymer matrix were prepared by dissolving the organic micropore-forming templates in the polymer solution followed by solution-casting and solvent evaporation or solvent exchange. Low-temperature selectively pyrolyzing micropore-forming templates in the micropore-forming template/polymer blend membranes at a nitrogen flow resulted in the formation of flexible microporous partially pyrolyzed polymeric membranes.

7 Claims, 5 Drawing Sheets

U.S. PATENT DOCUMENTS

| | | | | |
|---|---|---|---|---|
| 5,447,559 | A | 9/1995 | Rao et al. | 96/4 |
| 5,507,856 | A | 4/1996 | Rao et al. | 95/50 |
| 5,538,536 | A | 7/1996 | Fuentes et al. | 95/45 |
| 5,935,646 | A * | 8/1999 | Raman et al. | 427/244 |
| 6,048,388 | A | 4/2000 | Schwarz | 106/31.27 |
| 6,121,716 | A * | 9/2000 | Kronberg et al. | 310/322 |
| 6,248,682 | B1 | 6/2001 | Thompson et al. | 502/4 |
| 6,500,233 | B1 | 12/2002 | Miller et al. | 95/50 |
| 6,503,295 | B1 | 1/2003 | Koros et al. | 95/51 |
| 6,508,860 | B1 | 1/2003 | Kulkarni et al. | 95/51 |
| 6,562,110 | B2 | 5/2003 | Koros et al. | 96/4 |
| 6,579,343 | B2 | 6/2003 | Brennecke et al. | 95/45 |
| 6,585,802 | B2 | 7/2003 | Koros et al. | 95/51 |
| 6,605,140 | B2 | 8/2003 | Fuiver et al. | 96/4 |
| 6,626,980 | B2 | 9/2003 | Hasse et al. | 95/51 |
| 6,663,805 | B1 | 12/2003 | Ekiner et al. | 264/45.9 |
| 6,719,147 | B2 * | 4/2004 | Strano et al. | 210/490 |
| 6,726,744 | B2 | 4/2004 | Kulprathipanja et al. | 95/45 |
| 6,740,143 | B2 | 5/2004 | Corbin et al. | 96/11 |
| 6,755,900 | B2 | 6/2004 | Koros et al. | 96/10 |
| 6,756,085 | B2 * | 6/2004 | Waldfried et al. | 427/515 |
| 6,863,983 | B2 | 3/2005 | Tsapatsis et al. | 428/446 |
| 6,932,859 | B2 | 8/2005 | Koros et al. | 96/10 |
| 6,946,015 | B2 | 9/2005 | Jorgensen et al. | 95/51 |
| 6,997,971 | B1 | 2/2006 | Young et al. | 95/45 |
| 7,025,804 | B2 | 4/2006 | Simmons et al. | 95/51 |
| 7,098,149 | B2 * | 8/2006 | Lukas et al. | 438/778 |
| 7,109,140 | B2 | 9/2006 | Marand et al. | 502/4 |
| 7,138,006 | B2 | 11/2006 | Miller et al. | 95/45 |
| 7,166,146 | B2 | 1/2007 | Miller et al. | 95/45 |
| 2002/0053284 | A1 | 5/2002 | Koros et al. | 95/51 |
| 2002/0142172 | A1 * | 10/2002 | Brinker et al. | 428/446 |
| 2003/0060521 | A1 * | 3/2003 | Fisher | 521/27 |
| 2003/0220188 | A1 | 11/2003 | Marand et al. | 502/60 |
| 2004/0107830 | A1 | 6/2004 | Simmons et al. | 95/45 |
| 2004/0147796 | A1 | 7/2004 | Roman et al. | 585/144 |
| 2004/0172973 | A1 * | 9/2004 | Chen et al. | 65/17.2 |
| 2004/0175957 | A1 * | 9/2004 | Lukas et al. | 438/778 |
| 2005/0043167 | A1 | 2/2005 | Miller et al. | 502/4 |
| 2005/0139066 | A1 | 6/2005 | Miller et al. | 95/45 |
| 2005/0230305 | A1 | 10/2005 | Kulkarni et al. | 210/500.23 |
| 2005/0268782 | A1 | 12/2005 | Kulkarni et al. | 96/4 |
| 2006/0107830 | A1 | 5/2006 | Miller et al. | 95/45 |
| 2006/0117949 | A1 | 6/2006 | Kulkarni et al. | 95/45 |
| 2007/0022877 | A1 | 2/2007 | Marand et al. | 95/51 |
| 2007/0128879 | A1 * | 6/2007 | Rhee et al. | 438/758 |

FOREIGN PATENT DOCUMENTS

WO    WO 2007/007051 A1    1/2007

OTHER PUBLICATIONS

Giancoli (Physics for Scientists & Engineers) 3rd Ed. 2000, Prentice Hall, p. 310.*

"Polycarbonate (PC)." Encyclopdia Britannica. Encyclopædia Britannica Online. Encyclopædia Britannica, 2011. Web. Apr. 6, 2011.*

Ozaki, J. et al., "Novel preparation method for the production of mesoporous carbon fiber from a polymer blend" Journal: Carbon— American Carbon Committee—, 1997 Elsevier Science Ltd., Carbon vol. 35, No. 7, pp. 1031-1033.

Kang, J.S. et al., "Effects of Molecular Weight of Polyvinylpyrrolidone on Precipitation Kinetics During the Formation of Asymmetric Polyacrylonitrile Membrane" Journal of Applied Polymer Science, 2002, vol. 85, Part 1, pp. 57-68, 2002 Wiley Periodicals, Inc.

Kim, J.H. et al., "Effect of PEG additive on membrane formation by phase inversion" Journal of Membrane Science 138 (1998) pp. 153-163 1998 Elsevier Science B.V.

Islam, M.N. et al., "Preparation and gas separation performance of flexible pyrolytic membranes by low-temperature pyrolysis of sulfonated polyimides", Journal of Membrane Science 261 (2005) pp. 17-26 2005 Elsevier B.V.

Barsema, J.N. et al., "Intermediate polymer to carbon gas separation membranes based on Matrimid PI", Journal of Membrane Science 238 (2004) pp. 93-102 2004 Elsevier B.V.

Edited by Norman N. Li et al., Chapter 24: Polymeric Membrane Materials and Potential Use in Gas Separation; in book: Advanced Membrane Technology and Applications, Section 24.4.4, cover and p. 652, Wiley, 2007.

* cited by examiner

FLEXIBLE TEMPLATE-DIRECTED MICROPOROUS PARTIALLY PYROLYZED POLYMERIC MEMBRANES

CROSS-REFERENCE TO RELATED APPLICATION

This application claims priority from Provisional Application Ser. No. 60/781,289 filed Mar. 10, 2006, the contents of which are hereby incorporated by reference.

BACKGROUND OF THE INVENTION

This invention pertains to a new concept of flexible template-directed microporous partially pyrolyzed polymeric membranes. More specifically, this invention pertains to a method for producing flexible microporous partially pyrolyzed polymeric membranes using organic hosts, such as crown ethers, cyclodextrins (CDs), calixarenes (CXs), and spherands, or polymeric additives, such as poly(ethylene glycol) (PEG) and polyvinylpyrrolidone (PVP) as micropore-forming templates. Selectively pyrolyzing micropore-forming templates in the micropore-forming template/polymer blend membranes at low-temperature resulted in the formation of flexible microporous partially pyrolyzed polymeric membranes. This invention also pertains to the application of the described membranes for gas separations such as $H_2/CH_4$ and $CO_2/CH_4$ separations.

Over the past decades, membrane-based gas separation processes have evolved rapidly. Membrane-based gas separation is of special interest to petroleum producers and refiners, chemical companies, and industrial gas suppliers because of its low-energy requirements and simple system features. Several polymeric membrane-based gas separation applications have achieved commercial success, including $CO_2$ removal from natural gas and from biogas and enhanced oil recovery, and also $H_2$ removal from $N_2$, $CH_4$, and Ar in ammonia purge gas streams. For example, UOP's Separex® membrane is currently an international market leader for $CO_2$ removal from natural gas.

To compare with conventional separation processes, however, new membrane materials with better separation performance still need to be developed due to the limitations of currently available membrane materials including both organic polymeric and inorganic materials.

For gas separations such as $CO_2/CH_4$, $H_2/CH_4$, and $O_2/N_2$, polymeric membranes such as cellulose acetate and polyimide membranes are currently used because of their relatively low cost, easy processability, and reasonably good gas separation properties. These polymeric materials can separate specific gas molecules through a solution-diffusion mechanism. Although these polymeric materials have many advantages, they are limited in a number of properties including selectivity, permeability, plasticization issue, chemical and thermal stabilities. The main challenges are: achieving higher selectivity with acceptable productivity and maintaining these properties in the presence of complex and aggressive feeds.

Inorganic membranes such as zeolites, nanoporous carbons, and sol-gel derived silica are very attractive for gas separations because of their high permeability, excellent selectivity, and high chemical and thermal stabilities. See Newsman, SCIENCE, 231: 1093 (1986); Thomas, ANGEW. CHEM. INT. ED., 27: 1673 (1988); Bein, CHEM. MATER., 8: 1636 (1996); Shiflett, et al., SCIENCE, 285: 1902 (1999); Shiflett, et al., ADV. MATER., 12: 21 (2000); and de Vos, et al., SCIENCE, 279: 1710 (1998). These inorganic materials can separate specific gas molecules more selectively through a molecular-sieving mechanism. However, the challenges faced by current inorganic membrane technology are: high cost, poor processability, and poor mechanical strength. It is clear from the above discussion that inorganic membranes still require improvement before they can become a dominant commercialized inorganic membrane.

Therefore, discovering new membranes to provide excellent separation properties of inorganic membrane materials without losing the economical processability of polymeric membrane materials would be a major breakthrough for the field of membrane separation technology.

To overcome the challenges facing both inorganic and polymeric membranes, in the present invention, we developed flexible template-directed microporous partially pyrolyzed polymeric membranes which have showed greatly improved separation characteristics while maintaining the flexibility and mechanical strength compared to the corresponding unpyrolyzed polymeric membranes.

SUMMARY OF THE INVENTION

This invention describes a new concept of flexible template-directed microporous partially pyrolyzed polymeric membranes which have greatly improved performance in separation of gas pairs compared to their precursor polymeric membranes. Organic hosts, such as crown ethers, cyclodextrins (CDs), calixarenes (CXs), and spherands, or polymeric additives, such as poly(ethylene glycol) (PEG) and polyvinylpyrrolidone (PVP) were used as the micropore-forming templates. Micropore-forming template/polymer blend membranes comprising organic micropore-forming templates embedded in a polymer matrix were prepared by dissolving the organic micropore-forming templates in the polymer solution followed by solution-casting and solvent evaporation or solvent exchange. Low-temperature selectively pyrolyzing micropore-forming templates in the micropore-forming template/polymer blend membranes at a nitrogen flow resulted in the formation of flexible microporous partially pyrolyzed polymeric membranes. The formation of micropores with an average pore diameter <2 nm in the flexible template-directed microporous partially pyrolyzed polymeric membranes is due to the thermally unstable micropore-forming templates decomposing to induce micropores in the partially pyrolyzed polymer matrix formed from the stable polymer. These micropores are considered to remain to some extent as small free volume holes in the polymer matrix.

The membranes described in this invention have greatly increased selectivities and reasonably high permeabilities in separation of gases, good resistance to plasticization by $CO_2$ or hydrocarbons such as $C_3H_6$, increased thermal stability, enhanced chemical resistance, maintained flexibility and mechanical strength compared to their precursor polymeric membranes.

The invention can be better understood with reference to the following drawings and description.

DETAILED DESCRIPTION OF THE INVENTION

Figure 1:
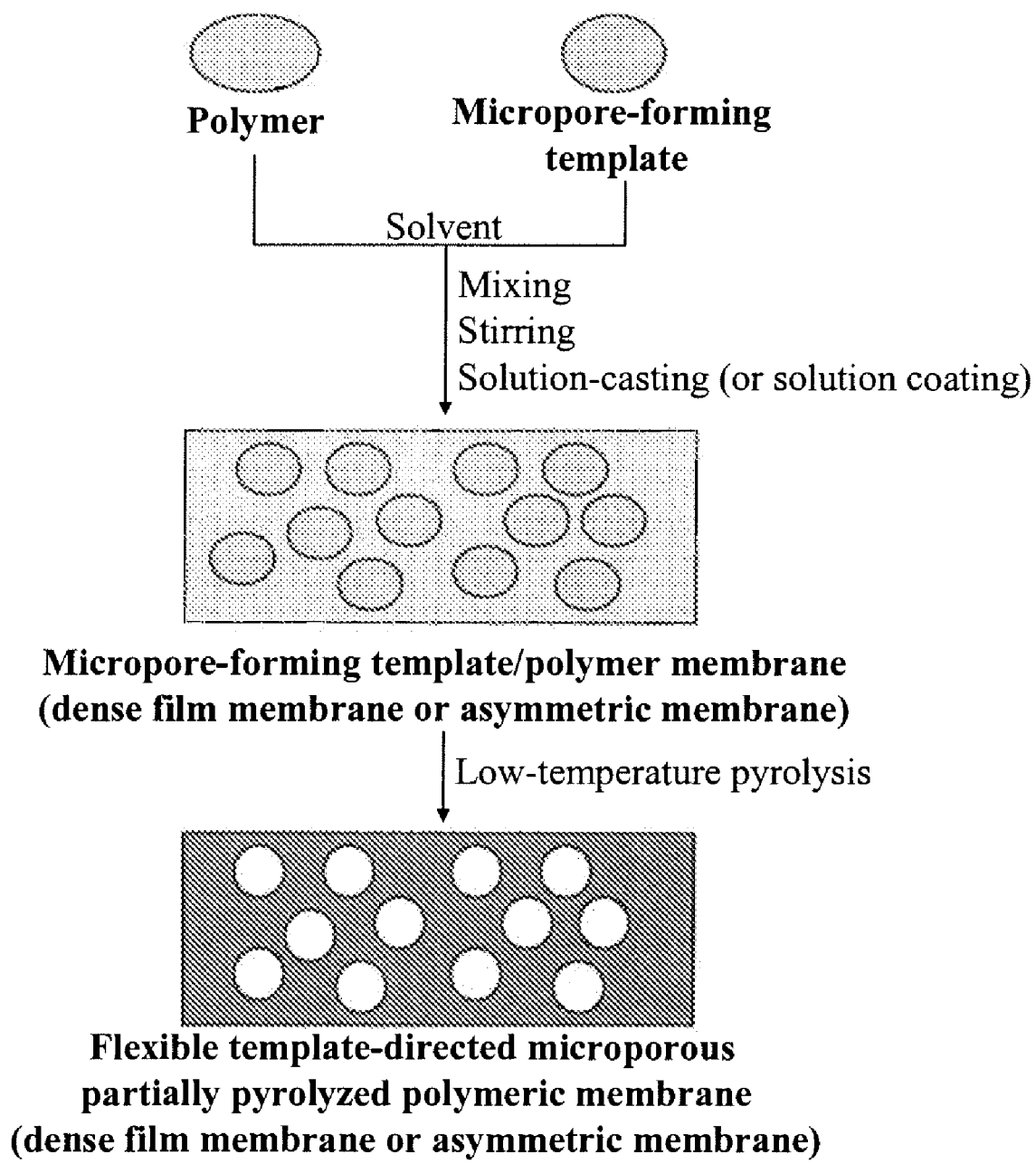
FIG. 1 is a graph illustrating the concept of flexible template-directed microporous partially pyrolyzed polymeric membranes.

In principle, membrane-based technologies have the advantages of both low capital cost and high-energy efficiency compared to conventional separation methods. Polymeric membranes have been proven to operate successfully in industrial gas separations. To combine high selectivity and high permeability together with high thermal stability, new high-performance polymers such as polyimides (PIs), poly (trimethylsilylpropyne) (PTMSP), and polytriazole were developed. These new polymeric membrane materials have shown promising properties for separation of gas pairs such as $CO_2/CH_4$, $O_2/N_2$, $H_2/CH_4$, and $C_3H_6/C_3H_8$. However, current polymeric membrane materials have reached a limit in their productivity-selectivity trade-off relationship. In addition, polymeric membranes have a plasticization problem in the presence of condensable gases such as $CO_2$ or $C_3H_6$. Plasticization of the polymer is represented by the membrane structure swelling and by a significant increase in the permeabilities of all components in the feed occurs above the plasticization pressure when the feed gas mixture contains condensable gases.

To overcome the limitations of polymeric membranes, inorganic molecular sieving membrane materials, such as carbon molecular sieves (CMSs), zeolites, and carbon-silica, have been investigated by researchers. Most of the CMS membranes are prepared by pyrolysis of various polymeric precursors, such as PI, polyacrylonitrile, poly(furfuryl alcohol), and phenolic resin, at temperatures well above 500° C. Compared to their polymeric membrane precursors, these CMS membranes display better gas separation selectivity and better thermal stability without the plasticization problem. However, with current membrane manufacturing techniques, these carbon molecular sieve membranes are high in cost. In addition, it is quite difficult to produce large-scale defect-free membranes with sufficient mechanical strength as the result of their inherent brittleness, which restricts their commercial applications.

More recently, Barsema et al. have reported that intermediate pre-carbonization (or partially pyrolyzed) gas separation membranes based on polyimides possess challenging properties. They have shown that heat treatment of Matrimid® flat sheet dense membranes, in an inert atmosphere, can alter the membrane properties as well as molecular structure. These partially pyrolyzed membranes combine properties of both polymers and carbons. Plasticization by $C_3H_6$ is successfully suppressed by heat treatments over 300° C. See Barsema, et al., J. MEMBR. SCI, 238: 93 (2004).

Most recently, flexible pyrolytic membranes were prepared by low-temperature pyrolysis of sulfonated polyimides. See Islam, et al., J. MEMBR. SCI, 261: 17 (2005). The sulfonated polyimides were pyrolyzed at a relatively low-temperature of 450° C. for 1.5 h at a nitrogen flow. During the pyrolysis, the —$SO_3H$ groups decomposed without substantial cleavage of the polyimide backbone. Decomposition of —$SO_3H$ groups induced microvoids, which are considered to remain to some extent as larger-size free volume holes in the polymer matrix. The pyrolytic membranes had the interesting intermixed properties of toughness and good flexibility as in polymer membranes and high gas permeability with reasonably high selectivity as in CMS membranes.

To date, polymeric additives such as PVP and PEG have been used as pore-forming agents to prepare ultrafiltration polymeric membranes. See Kim, et al., J. MEMBR. SCI, 138: 153 (1998); Kang, et al., J. APPL. POLYM. SCI, 85: 57 (2002). Ozaki et al. first demonstrated that the pyrolysis of blended polymers led to the creation of two different porous carbon structures because the thermally labile polymer (favoring a low carbon yield) was completely decomposed at a temperature lower than the decomposition temperature of the thermally stable polymer (favoring a high carbon yield). Consequently, larger pores were created, derived from the thermally labile polymer in the microporous carbon materials formed from the thermally stable polymer. See Ozaki, et al., CARBON, 35: 1031 (1997).

Here in this invention, we developed a new concept of flexible template-directed microporous partially pyrolyzed polymeric membranes. These membranes have greatly improved performance in separation of gas pairs compared to their precursor polymeric membranes.

The concept of flexible template-directed microporous partially pyrolyzed polymeric membranes is shown in FIG. 1.

The idea of our novel method for the production of flexible template-directed microporous partially pyrolyzed polymeric membranes in this invention is based on the differences of the thermal stabilities of the micropore-forming templates and the polymer matrix. Organic hosts, such as crown ethers, cyclodextrins (CDs), calixarenes (CXs), and spherands, or polymeric additives, such as poly(ethylene glycol) (PEG) and polyvinylpyrrolidone (PVP) were used as the microporeforming templates. The micropore-forming templates (e.g. 2,3,6-triacetyl β-cyclodextrin (acetyl-β-CD)) tend to decompose into gaseous products to leave micropores with an average pore diameter <2 nm at certain temperature while the extent of the thermal decomposition of the continuous polymer matrix (e.g. Matrimid® polymer) is small at the same pyrolyzing temperature. Micropore-forming template/polymer blend membranes comprising organic micropore-forming templates embedded in a polymer matrix were prepared by dissolving the organic micropore-forming templates in the polymer solution followed by solution-casting and solvent evaporation or solvent exchange. Low-temperature selectively pyrolyzing micropore-forming templates in the micropore-forming template/polymer blend membranes at an inert $N_2$ flow resulted in the formation of flexible microporous partially pyrolyzed polymeric membranes. The formation of micropores in the flexible template-directed microporous partially pyrolyzed polymeric membranes is due to the thermally unstable micropore-forming templates decomposing to leave micropores in the partially pyrolyzed polymer matrix formed from the stable polymer.

Materials Selection

Design of successful flexible template-directed microporous partially pyrolyzed polymeric membranes with greatly improved performance in separation of gas pairs compared to their precursor polymeric membranes is critically based on the proper selection of thermally labile microporeforming template and the thermally stable polymer matrix, as well as the blend ratio (the ratio of micropore-forming template to polymer matrix).

Thermally stable polymer matrix as a continuous phase provides a wide range of properties important for membrane gas separations such as high thermal stability, reasonably good gas separation performance, low cost, and easy processability. The polymer matrices should be selected from thermally stable polymeric materials. For the preparation of a flexible template-directed microporous partially pyrolyzed polymeric membrane, it is preferred that the continuous polymer matrix should be thermally stable up to at least 150° C., more preferably up to at least 300° C., most preferably up to at least 450° C. In the meantime, it is preferred that the continuous polymer matrix exhibits a carbon dioxide or hydrogen over methane selectivity of at least about 10, more preferably at least about 20. Preferably, the polymer used as the continuous polymer matrix for the preparation of flexible template-directed microporous partially pyrolyzed polymeric membranes is a rigid, glassy polymer.

Typical polymers suitable to be used for the preparation of flexible template-directed microporous partially pyrolyzed polymeric membranes according to this invention can be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides (e.g. Matrimid® polyimide polymer); polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Thermally labile micropore-forming template described in this invention is used as the micropore-forming agent to induce micropores in the flexible microporous partially pyrolyzed polymeric membranes. For the preparation of a flexible template-directed microporous partially pyrolyzed polymeric membrane, the thermal decomposition temperature of the micropore-forming template should be at least 10° C. lower than that of the continuous polymer matrix. It is preferred that the thermally labile micropore-forming templates should be able to be decomposed into gaseous products to leave micropores with an average pore diameter <2 nm at 400° C. or lower temperature.

Thermally labile micropore-forming templates suitable for the preparation of flexible microporous partially pyrolyzed polymeric membranes include organic hosts such as crown ethers, cyclodextrins (CDs, e.g., 2,3,6-triacetyl β-cyclodextrin (acetyl-β-CD)), calixarenes (CXs), and spherands, or thermally labile polymeric additives. Suitable thermally labile polymeric additives include poly(ethylene glycol)s (PEG), polyvinylpyrrolidone (PVP), poly(acrylic acid), poly(ethylene oxide)s (PEO), dendritic PEO, hyperbranched amine-terminated PEO, poly(propylene oxide)s (PPO), co-block-poly(ethylene oxide)-poly(propylene oxide)s (PEO-PPO), tri-block-poly(propylene oxide)-poly(ethylene oxide)-poly(propylene oxide)s (PPO-PEO-PPO), poly(propylene glycol)-block-poly(ethylene glycol)-block-poly(propylene glycol) bis(2-aminepropyl ether) (PAPE), linear and star-shaped poly(caprolactone). The micropore-forming templates tend to decompose into gaseous products to leave micropores with an average pore diameter <2 nm at certain temperature while the extent of the thermal decomposition of the continuous polymer matrix is small at the same pyrolyzing temperature.

Figure 2:
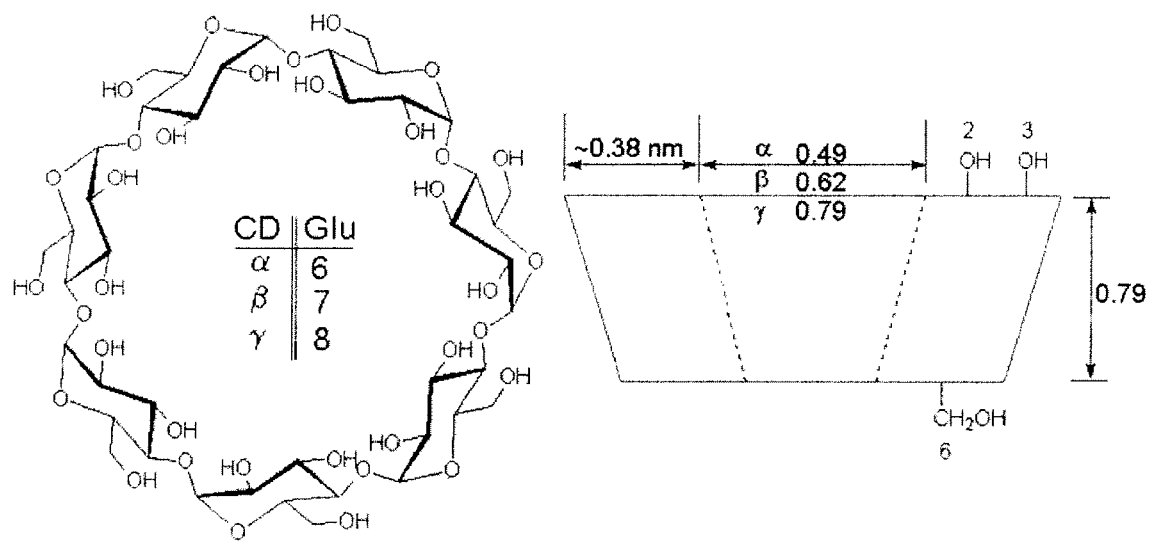
FIG. 2 shows the chemical structure of α-, β- and γ-cyclodextrins (α-, β- and γ-CDs).

The most famous organic hosts include crown ethers, cyclodextrins (CDs), calixarenes (CXs), and spherands. These molecules usually are soluble in aqueous or organic solvents. CDs are cyclic oligomers of glucose, which possess a hydrophilic exterior and a hydrophobic microporous interior into which a variety of small, usually neutral, molecules may be introduced (FIG. 2). CXs are cyclic oligomers of aligned phenols connected by methylene units. These hosts offer cavities on the nanometer scale, generally smaller than some of the zeolite cavities. Moreover, in contrast to zeolites, CDs and CXs usually are soluble in organic solvents.

Figure 3:
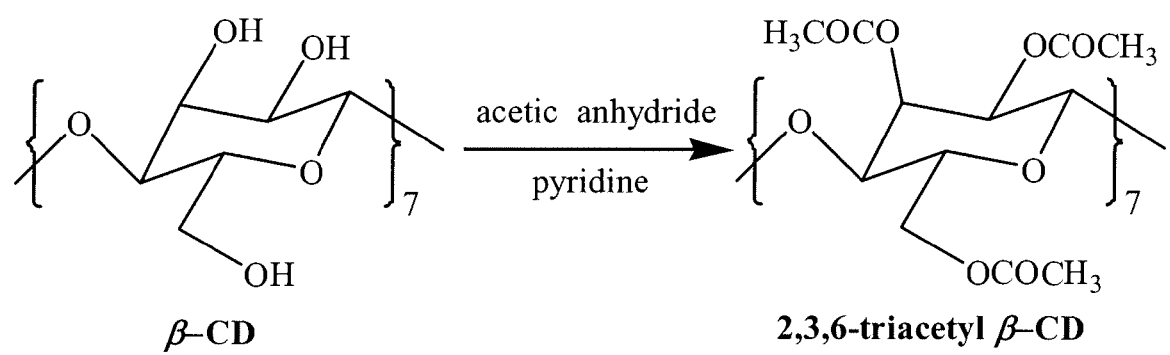
FIG. 3 shows the synthesis of acetyl-β-CD.
Figure 4:
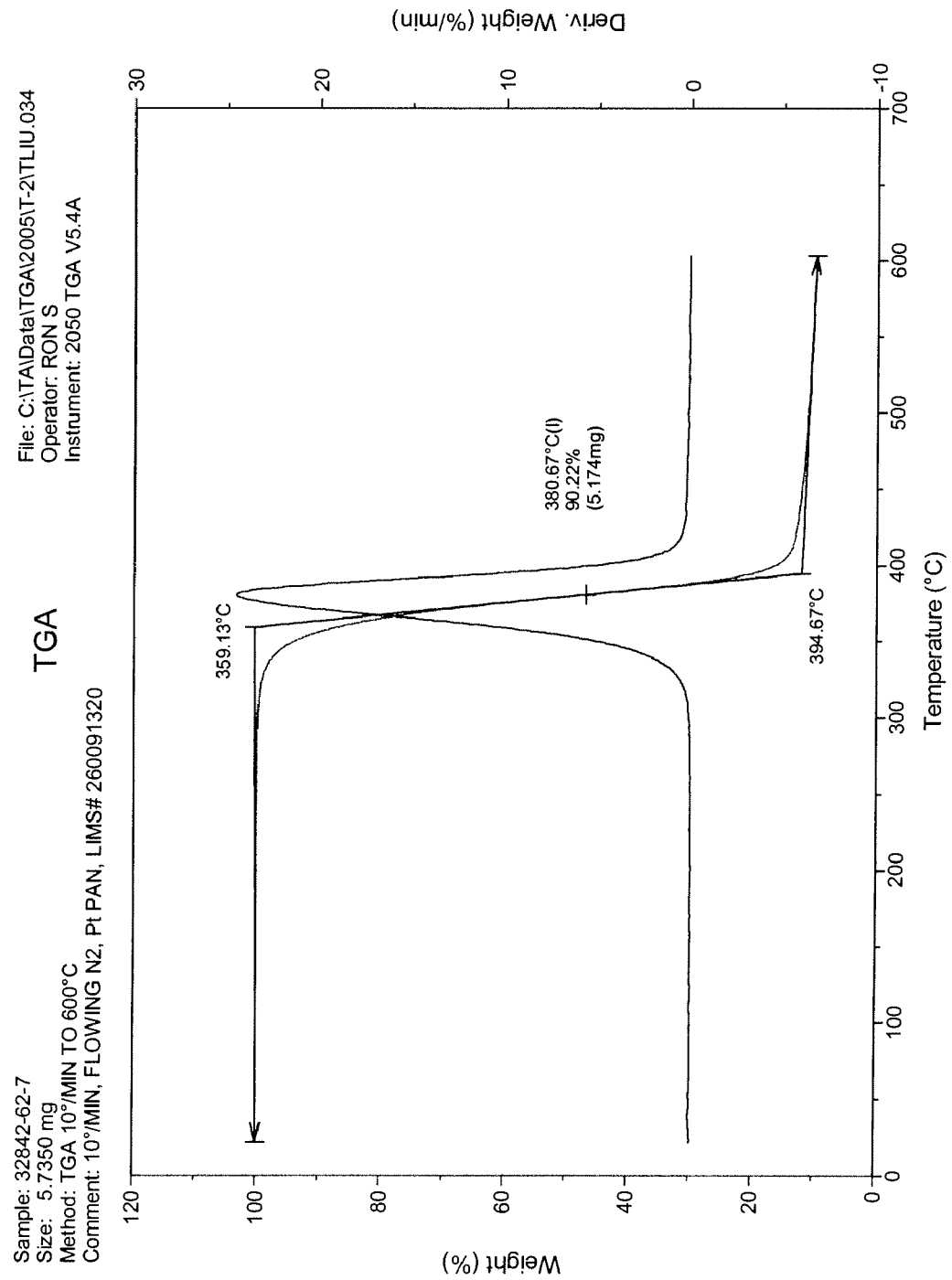
FIG. 4 shows the thermogravimetric analysis (TGA) curve of acetyl-β-CD.
Figure 5:
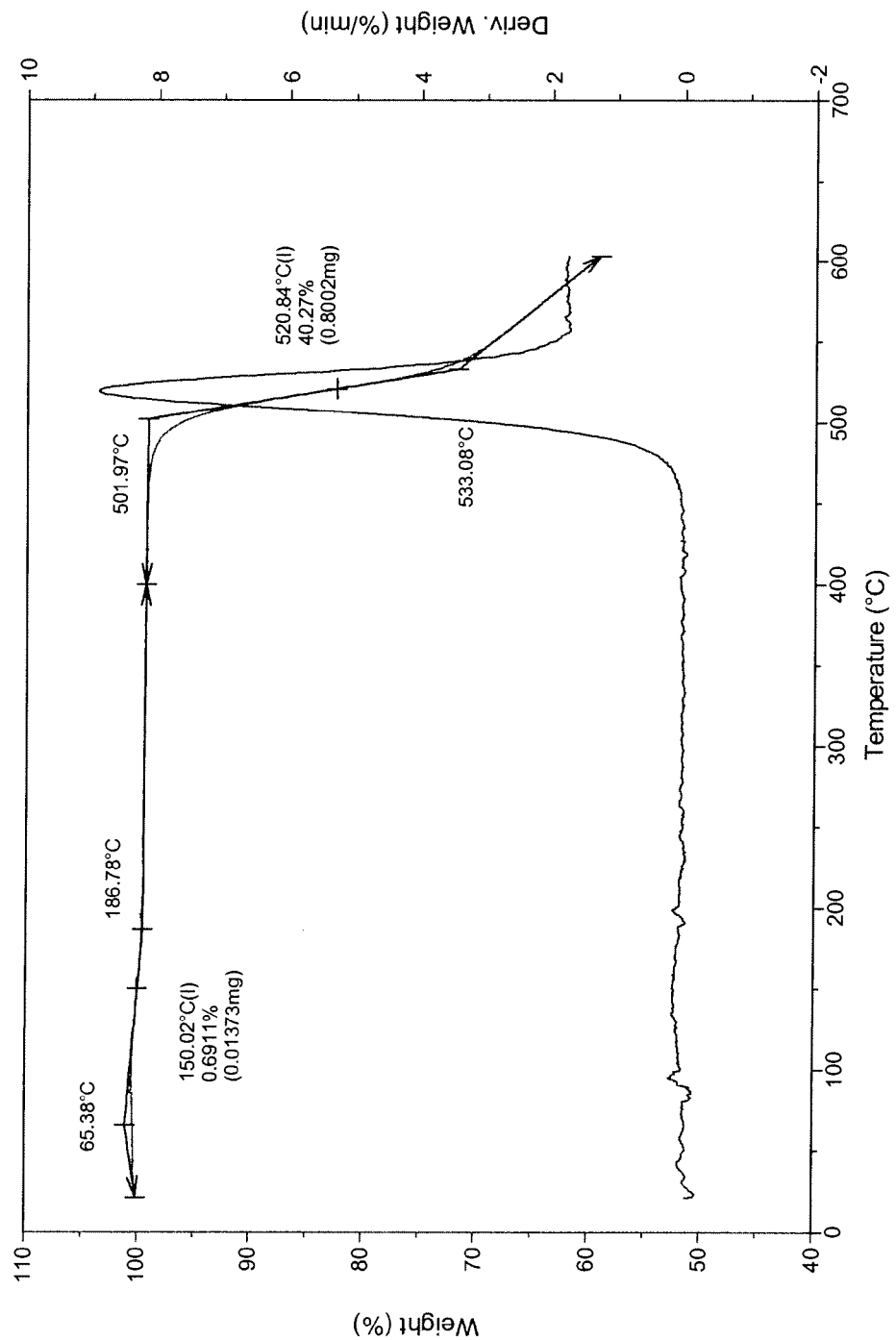
FIG. 5 shows the TGA curve of pure Matrimid®.

In order to increase the solubility of β-CD in organic solvents such as dichloromethane, β-CD was modified by introducing acetyl groups into the hydroxyl groups in 2,3 and 6 positions to form acetyl-β-CD as shown in FIG. 3. The acetyl-β-CD molecule has good solubility in organic solvents. FIG. 4 shows the TGA curve of acetyl-β-CD. It can be seen that about 90% of the acetyl-β-CD molecules will decompose at 400° C. under $N_2$. Therefore, acetyl-β-CD molecules are good micropore-forming templates in a continuous thermally stable polymer matrix (e.g., Matrimid® with thermal decomposition temperature higher than 450° C.) for the preparation of flexible microporous partially pyrolyzed polymeric membranes. FIG. 5 shows that Matrimid® is thermally stable up to 450° C. Therefore, acetyl-β-CD/Matrimid® blend polymeric membrane is a good precursor membrane for the preparation of flexible microporous partially pyrolyzed Matrimid® membrane.

Membrane Preparation

The micropore-forming template/polymer blend membranes used in the present invention as precursor membranes for the preparation of flexible microporous partially pyrolyzed polymeric membranes were prepared by mixing certain amount of micropore-forming templates in a continuous polymer matrix. The most preferred micropore-forming template/polymer blend membranes used in this present invention were fabricated as follows.

The micropore-forming template/polymer blend membranes were prepared from solution casting of a solution containing certain amount of micropore-forming templates and certain amount of polymer. The solvents that can be used for dissolving the micropore-forming templates and the continuous polymer matrix include methylene chloride, THF, acetone, DMF, NMP, DMSO, and others known to those skilled in the art. The weight ratio of the micropore-forming template to the polymer matrix in the membranes varied from 0.01:1 to 1:1 depending upon the properties sought.

Certain amounts of polymer as matrix and micropore-forming templates were added to an organic solvent. After stirring for 6 hours, both the polymer and the templates dissolved completely in the solvent to form a transparent homogeneous solution. The solution with micropore-forming template was poured into a glass ring on top of a clean glass plate, and dried at room temperature inside a plastic cover for at least 12 hours to obtain the final blend membrane. The membrane was detached from the glass plate and dried at room temperature for 24 hours and then at 110° C. for at least 48 hours under vacuum. Using this method, acetyl-β-CD/Matrimid® blend membranes with different amounts of acetyl-β-CD templates (e.g., 30% acetyl-β-CD/Matrimid® membrane containing 30 wt-% acetyl-β-CD based on the weight of Matrimid® were prepared.

The flexible template-directed microporous partially pyrolyzed polymeric membranes were prepared by further pyrolyzing the micropore-forming template/polymer blend membranes at a certain temperature in an inert atmosphere depending upon the separation properties sought. Using this method, flexible microporous partially pyrolyzed Matrimid® membrane was prepared from acetyl-β-CD/Matrimid® blend membrane by pyrolyzing at 425° C. in a $N_2$ flow for 2 h to decompose acetyl-β-CD templates (e.g., 30% acetyl-β-CD/Matrimid®-425° C.-2 h membrane prepared from 30% acetyl-β-CD/Matrimid membrane at 425° C. in a $N_2$ flow for 2 h). The formation of micropores in the flexible microporous partially pyrolyzed Matrimid® membrane is due to the thermally unstable micropore-forming acetyl-β-CD templates decomposing to induce micropores in the partially pyrolyzed Matrimid® matrix.

Pure Gas Permeability Measurements (Results)

The pure gas permeabilities of carbon dioxide ($CO_2$), methane ($CH_4$) and hydrogen ($H_2$)($P_{CO2}$, $P_{CH4}$, $PH_2$) and selectivities for $H_2/CH_4$ and $CO_2/CH_4$ (($\alpha_{H2/CH4}$ and $\alpha_{CO2/CH4}$) of the micropore-forming template/polymer blend membranes and the flexible template-directed microporous partially pyrolyzed polymeric membranes were measured by pure gas measurements at 50° C. under 690 kPa (100 psig) pressure. The results are summarized in Table 1.

As shown in Table 1, for the flexible partially pyrolyzed Matrimid® polyimide membrane, Matrimid®-425° C.-2 h, the gas separation performances for $CO_2/CH_4$ and $H_2/CH_4$ are similar to those of the precursor Matrimid® polyimide membrane, indicating that no substantial cleavage of the Matrimid® polymer backbone occurred at 425° C. in $N_2$ atmosphere. The slight decrease in $P_{CO2}$, $P_{CH4}$ and $P_{H2}$ is most likely caused by the formation of charge transfer complexes (CTC) through the increased chain mobility. CTCs are weak, intra- and inter-molecular bonds between the electron-rich aromatic ring and the electron-deficient imide ring of the Matrimid polyimide, formed by the donation of π-electrons.

For the flexible microporous partially pyrolyzed 30% acetyl-β-CD/Matrimid®-425° C.-2 h membrane, during the pyrolysis at 425° C., the acetyl-β-CD templates decomposed to induce microvoids without substantial cleavage of the Matrimid® polyimide backbone. Compared to the unpyrolyzed Matrimid® membrane, the permeabilities of $CO_2$ and $CH_4$ for the 30% acetyl-β-CD/Matrimid®-425° C.-2 h membrane decreased, however, the $CO_2/CH_4$ and $H_2/CH_2$ selectivities increased about 18% and more than 50%, respectively. These results indicate that acetyl-β-CD templates are attractive additives as micropore-forming agents during low temperature pyrolysis of the blend membrane for universally enhancing the selectivities of gas pairs with reasonably good permeability.

TABLE 1

Pure gas permeation test results of unpyrolyzed and partially pyrolyzed Matrimid ® and acetyl-β-CD/Matrimid ® dense membranes[a]

| Film | $P_{CO2}$ (barrer) | $P_{CH4}$ (barrer) | $\alpha_{CO2/CH4}$ | Increase of $\alpha_{CO2/CH4}$ | $P_{H2}$ (barrer) | $\alpha_{H2/CH4}$ | Increase of $\alpha_{H2/CH4}$ |
|---|---|---|---|---|---|---|---|
| Matrimid ® | 10.0 | 0.355 | 28.2 | 0 | 33.1 | 93.2 | 0 |
| Matrimid ®-425° C.-2 h | 9.22 | 0.347 | 26.6 | −5.7% | 32.4 | 95.1 | 0 |
| 30% acetyl-β-CD/Matrimid ® | 7.75 | 0.317 | 24.4 | −13.5% | 24.5 | 77.2 | −17.2% |
| 30% acetyl-β-CD/Matrimid ®-425° C.-2 h | 4.60 | 0.138 | 33.3 | 18.1% (compare to Matrimid ®) 36.5% (compare to 30% acetyl-β-CD/Matrimid ®) | 20.0 | 145.3 | 55.9% (compare to Matrimid ®) 88.2% (compare to 30% acetyl-β-CD/Matrimid ®) |

Figure 6:
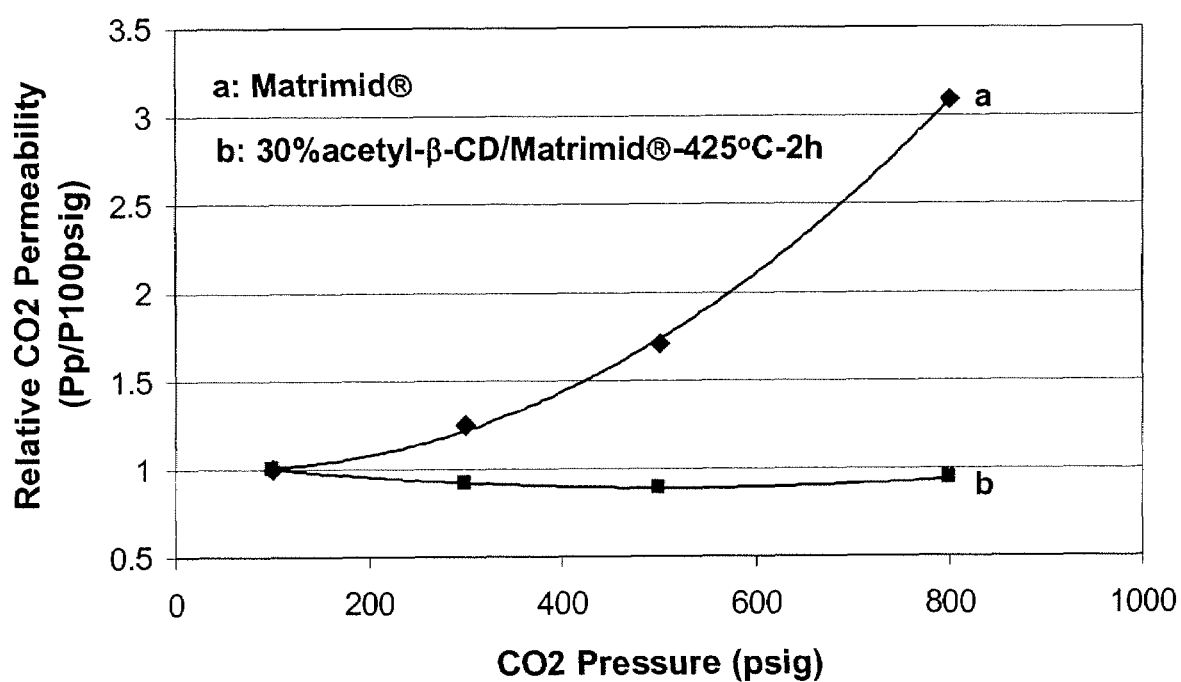
FIG. 6 shows the effect of the applied $CO_2$ pressures on the relative $CO_2$ permeability in (a) Matrimid® and (b) 30% acetyl-β-CD/Matrimid® at 425° C. and 2 hours dense films at 50° C.

[a]Tested at 50° C. under 690 kPa (100 psig); 1 barrer = $10^{-10}$ $cm^3$(STP) · cm/$cm^2$ · sec · cmHg In addition to greatly improved selectivities for gas separations, this new type of flexible template-directed microporous partially pyrolyzed Matrimid® membranes also have high plasticization-resistant property in the presence of condensable gases such as $CO_2$ or $C_3H_6$ under high testing pressure and mixed gas conditions. The flexible template-directed microporous partially pyrolyzed Matrimid® membranes as described in this invention also have good mechanical and chemical stabilities compared to the original Matrimid® membrane and the partially pyrolyzed Matrimid® membrane. For example, the effect of partial pyrolyzation on the plasticization resistance of 30% acetyl-β-CD/Matrimid® membranes were studied. The unpyrolyzed Matrimid®, partially pyrolyzed Matrimid®, and the partially pyrolyzed 30% acetyl-β-CD/Matrimid®-425° C.-2 h dense films were conditioned with $CO_2$ at different pressures. Table 2 and FIG. 6 show the change of $CO_2$ relative permeability with the increase of the applied $CO_2$ pressure at 50° C. It can be seen that the unpyrolyzed Matrimid® dense film exhibited 71% increase in $CO_2$ permeability under the applied $CO_2$ pressure of 3447 kPa (500 psig) compared to that under 690 kPa (100 psig) applied $CO_2$ pressure. When the applied $CO_2$ pressure increased to 5516 kPa (800 psig), the unpyrolyzed Matrimid® dense film exhibited 209% increase in $CO_2$ permeability. This significant $CO_2$ permeability increase when the applied $CO_2$ pressure is above 2068 kPa (300 psig) is due to the $CO_2$ plasticization (swelling) of Matrimid® polymer. For the partially pyrolyzed Matrimid®-425° C.-2 h dense film, no $CO_2$ plasticization was observed up to 2068 kPa (300 psig) high $CO_2$ pressure. This film, however, was broken under $CO_2$ pressure higher than 2068 kPa (300 psig), indicating relatively poor mechanical strength. For the partially pyrolyzed 30% acetyl-β-CD/Matrimid®-425° C.-2 h dense film, however, no $CO_2$ plasticization was observed up to 5516 kPa (800 psig) high $CO_2$ pressure. This significant enhancement in $CO_2$ plasticization resistance for the partially pyrolyzed 30% acetyl-β-CD/Matrimid®-425° C.-2 h dense film compared to the unpyrolyzed Matrimid® dense film is mainly attributed to the partial pyrolyzation. In addition, the partially pyrolyzed 30% acetyl-β-CD/Matrimid®-425° C.-2 h dense film has high mechanical stability under high testing pressure. These comparison results on unpyrolyzed Matrimid® and the partially pyrolyzed 30% acetyl-β-CD/Matrimid®-425° C.-2 h dense films as shown in FIG. 6 and Table 2 demonstrate that the new flexible template-directed microporous partially pyrolyzed polymeric membranes described in this invention not only show greatly improved selectivity for gas separations, but also have no $CO_2$ plasticization effect induced by condensable gases such as $CO_2$ up to 5516 kPa (800 psig) high $CO_2$ pressure.

TABLE 2

Effect of $CO_2$ pressure on $CO_2$ permeability in Matrimid ® and 30% acetyl-β-CD/Matrimid ®-425° C.-2 h dense films at 50° C.[a]

| $CO_2$ pressure (x psig) | Matrimid ® | Ratio of P(x)/P(100) Matrimid ®-425° C.-2 h | 30% acetyl-β-CD/Matrimid ®-425° C.-2 h |
|---|---|---|---|
| 100 | 1.00 | 1.00 | 1.00 |
| 300 | 1.25 | 0.87 | 0.92 |
| 500 | 1.71 | Film broken | 0.89 |
| 800 | 3.09 | — | 0.94 |

[a]P(100) represents the $CO_2$ permeability in barrer under 690 kPa (100 psig) $CO_2$ pressure; P(x) represents the $CO_2$ permeability in barrer under x psig $CO_2$ pressure.

The high plasticization-resistant flexible template-directed microporous partially pyrolyzed polymeric membranes described in this invention such as acetyl-β-CD/Matrimid®-425° C.-2 h membrane can be used in any convenient form such as sheets, tubes or hollow fibers. These new membranes are useful for a variety of liquid, vapor, and gas separations such as separations of $CO_2/CH_4$, $H_2/CH_4$, $O_2/N_2$, $CO_2/N_2$, olefin/paraffin, iso/normal paraffins, polar molecules such as $H_2O$, $H_2S$, and $NH_3$/mixtures with $CH_4$, $N_2$, $H_2$, and other light gases separations, as well as desalination and pervaporation applications. The high plasticization-resistant flexible template-directed microporous partially pyrolyzed polymeric membranes of the present invention are especially useful in gas separation processes in petrochemical, refinery, and natural gas industries.

The invention claimed is:

1. A flexible organic micropore-forming template-directed microporous partially pyrolyzed polymeric organic membrane comprising partially pyrolyzed organic polymer wherein said organic polymer is selected from the group consisting of polysulfones, poly(styrenes), styrene-containing copolymers, polycarbonates, cellulosic polymers, polyamides, polyamic acids, polyimides, polyethers, poly(arylene oxides), poly(esteramide-diisocyanate), polyurethanes, polysulfides, polymers from monomers having alpha-olefinic unsaturation, polyvinyls, polyhydrazides, polyoxadiazoles, polytriazoles, poly(benzimidazole), polycarbodiimides, polyphosphazines, and mixtures thereof and wherein said organic micropore-forming template is selected from the group consisting of crown ethers, cyclodextrins, calixarenes, and spherands, polyvinylpyrrolidone, poly(acrylic acid), poly(ethylene oxide) (PEO), hyperbranched amine-terminated PEO, poly(propylene oxide) (PPO), co-block-poly(ethylene oxide)-poly(propylene oxide) (PEO-PPO), tri-block-poly(propylene oxide)-poly(ethylene oxide)-poly(propylene oxide) (PPO-PEO-PPO), poly(propylene glycol)-block-poly(ethylene glycol)-block-poly(propylene glycol) bis(2-aminopropyl ether) (PAPE), linear and star-shaped poly(caprolactone), and mixtures thereof and wherein said flexible organic micropore-forming template-directed microporous partially pyrolyzed polymeric organic membrane has micropores that have an average pore diameter of less than 2 nm.

2. A process for gas separation using the flexible organic micropore-forming template-directed microporous partially pyrolyzed polymeric organic membrane of claim 1 comprising contacting a mixture of gases on one side of said flexible organic micropore-forming template-directed microporous partially pyrolyzed polymeric organic membrane to cause at least one gas of the mixture of gases to permeate said flexible organic micropore-forming template-directed microporous partially pyrolyzed polymeric organic membrane; and removing from a side opposite to said one side of the flexible organic micropore-forming template-directed microporous partially pyrolyzed polymeric organic membrane a permeate gas composition comprising a portion of said at least one gas which has permeated said flexible organic micropore-forming template-directed microporous partially pyrolyzed polymeric organic membrane.

3. A method of making a flexible template-directed microporous partially pyrolyzed polymeric organic membrane comprising combining an organic polymer and an organic micropore-forming template and then heating the organic polymer and the organic micropore-forming template to a low-temperature pyrolysis.

4. The method of claim 3 wherein said organic polymer and said organic micropore-forming template are combined by mixing followed by solution-casting.

5. The method of claim 3 wherein said organic polymer is thermally stable from 25° C. to 450° C.

6. The method of claim 3 wherein said organic polymer is selected from the group consisting of polysulfones; poly(styrenes), styrene-containing copolymers, polycarbonates; cellulosic polymers, polyamides, polyamic acids, polyimides, polyethers; poly(arylene oxides), poly(esteramide-diisocyanate); polyurethanes; polysulfides; polymers from monomers having alpha-olefinic unsaturation, polyvinyls, poly(benzobenzimidazole); polyhydrazides; polyoxadiazoles; polytriazoles; poly(benzimidazole); polycarbodiimides; polyphosphazines; and mixtures thereof.

7. The method of claim 3 wherein said organic micropore-forming templates are selected from the group consisting of crown ethers, cyclodextrins, calixarenes, and spherands, polyvinylpyrrolidone, poly(acrylic acid), poly(ethylene oxide)s (PEO), dendritic PEO, hyperbranched amine-terminated PEO, poly(propylene oxide)s (PPO), co-block-poly(ethylene oxide)-poly(propylene oxide)s (PEO-PPO), tri-block-poly(propylene oxide)-poly(ethylene oxide)-poly(propylene oxide)s (PPO-PEO-PPO), poly(propylene glycol)-block-poly(ethylene glycol)-block-poly(propylene glycol) bis(2-aminopropyl ether) (PAPE), linear and star-shaped poly(caprolactone and mixtures thereof.

* * * * *